(12) United States Patent
Numajiri et al.

(10) Patent No.: US 8,430,639 B2
(45) Date of Patent: Apr. 30, 2013

(54) PITCH DRIVE APPARATUS OF WIND GENERATOR AND WIND GENERATOR

(75) Inventors: Tomohiro Numajiri, Nagasaki (JP); Takatoshi Matsushita, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 359 days.

(21) Appl. No.: 12/451,057

(22) PCT Filed: Apr. 10, 2009

(86) PCT No.: PCT/JP2009/057324
§ 371 (c)(1),
(2), (4) Date: Oct. 23, 2009

(87) PCT Pub. No.: WO2010/116520
PCT Pub. Date: Oct. 14, 2010

(65) Prior Publication Data
US 2011/0187104 A1 Aug. 4, 2011

(51) Int. Cl.
*F03D 7/04* (2006.01)

(52) U.S. Cl.
USPC ............................................ 416/155

(58) Field of Classification Search ......... 416/147, 416/155, 156, 157 R, 157 A, 157 B, 158, 416/168 R, 168 A
See application file for complete search history.

(56) References Cited

U.S. PATENT DOCUMENTS

| | | | | |
|---|---|---|---|---|
| 4,227,860 A | * | 10/1980 | Humphreys | 416/155 |
| 4,348,155 A | * | 9/1982 | Barnes et al. | 416/158 |
| 4,462,753 A | * | 7/1984 | Harner et al. | 416/158 |
| 6,604,907 B1 | * | 8/2003 | Lehnhoff | 416/156 |
| 2005/0118026 A1 | | 6/2005 | Egeren et al. | |

FOREIGN PATENT DOCUMENTS

| | | |
|---|---|---|
| JP | 57-000373 | 1/1982 |
| JP | 59-007785 | 1/1984 |
| JP | 08-035482 | 2/1996 |
| JP | H11-133481 | 5/1999 |
| JP | 2003-056448 | 2/2003 |
| JP | 2003-148321 | 5/2003 |
| JP | 2004-512450 | 4/2004 |
| JP | 2004-251122 | 9/2004 |
| JP | 2004-301031 A | 10/2004 |
| JP | 2005-009373 A | 1/2005 |
| JP | 2005-083308 | 3/2005 |
| JP | 2006-046107 | 2/2006 |
| WO | WO-2007/098759 A2 * | 9/2007 |

OTHER PUBLICATIONS

The State Intellectual Property Office of the People's of Republic of China , Notification on the Grant of Patent Right for Invention dated Jun. 5, 2012 issued for U.S. Appl. No. 12/515,858.
USPTO, Office Action dated Jun. 28, 2012 issued for U.S. Appl. No. 12/515,858.
Japan Patent Office, "Office Action for JP 2012-055482; a divisional application of JP 2009-545741", Mar. 5, 2013.

* cited by examiner

*Primary Examiner* — Christopher Verdier
(74) *Attorney, Agent, or Firm* — Manabu Kanesaka; Kenneth M. Berner; Benjamin J. Hauptman

(57) ABSTRACT

A pitch drive apparatus of a wind generator is made with a simple structure, and the wind generator is capable of preventing reliability of the pitch drive apparatus from being deteriorated. The wind generator includes a wind turbine rotor blade having a blade root mounted so as to be turnable around an axis center O with respect to a rotor head, and a pitch drive apparatus for turning and driving the wind turbine rotor blade around the axis center O to change a pitch angle thereof. The pitch drive apparatus has an electric cylinder functioning as a linear actuator.

13 Claims, 7 Drawing Sheets

PITCH DRIVE APPARATUS OF WIND GENERATOR AND WIND GENERATOR

TECHNICAL FIELD

The present invention relates to a pitch drive apparatus of a wind generator and the wind generator.

BACKGROUND ART

As a wind turbine used for a wind generator, there are known a wind turbine in which a pitch angle of a wind turbine rotor blade is fixed and a wind turbine in which the pitch angle is variable.

As a mechanism which changes the pitch angle of the wind turbine rotor blade, there is known a mechanism which converts linear motion of a rod in a hydraulic cylinder into rotation around an axis of the wind turbine rotor blade as described in Patent Citation 1.

As shown in Patent Citation 2 or the like, there is proposed a mechanism in which a gear is provided around a blade rotating wheel, a pinion gear meshing with this gear is rotated by an electric motor, the blade rotating wheel is rotated and this rotation is converted into rotation around an axis of a wind turbine rotor blade.

In this case, it is also proposed to use a belt instead of the gear.

Patent Citation 1: Japanese Unexamined Patent Application, Publication. No. 2003-148321
Patent Citation 2: Japanese Unexamined Patent Application, Publication No. 2003-56448

DISCLOSURE OF INVENTION

According to the mechanism which uses the hydraulic cylinder as shown in Patent Citation 1, control oil of the hydraulic cylinder is usually supplied to a rotor head from a hydraulic pump disposed in a nacelle through a main shaft or a gear box. Since a hydraulic pipe is disposed in the main shaft or the gear box, the structure thereof becomes complicated.

When the wind generator is assembled at the site, the nacelle and the rotor head assembled separately from each other are coupled together. At this time, a hydraulic pipe on the side of the nacelle and a hydraulic pipe on the side of the rotor head are connected to each other. If a foreign matter is mixed in the hydraulic pipe during the connecting operation, a seal of the hydraulic utility grid is damaged and thus there is a possibility that long-term reliability of the pitch drive mechanism is deteriorated.

There is an adverse possibility that oil leaks, which exerts an influence on the surrounding environment. Thus, it is necessary to pay close attention during the operation of connecting the hydraulic pipe.

According to the gear type pitch drive mechanism described in the Patent Citation 2, a pinion gear and a gear provided on a rotating wheel always mesh with each other. For example, when a pitch angle is finely adjusted repeatedly, since contact causing fine motion is concentrated locally, there is an adverse possibility that fretting damage caused by depletion of oil slick on a gear surface is caused. Thus, there is a possibility that long-term reliability of the pitch drive mechanism is deteriorated.

In the case of a belt type pitch drive mechanism, in order to apply tension, a belt is disposed outside the wind turbine rotor blade. Therefore, there is a possibility that a system is increased in size. Since lifetime of the belt is short, it is necessary to replace the belt frequently. Thus, if sufficient maintenance operation is not carried out, there is a possibility that long-term reliability of the pitch drive mechanism is deteriorated.

In view of the above circumstances, it is an object of the present invention to provide a pitch drive apparatus of a wind generator and a wind generator capable of preventing reliability of the pitch drive apparatus from being deteriorated with a simple structure.

To achieve the above object, the present invention provides the following means.

According to a first aspect of the present invention, there is provided a pitch drive apparatus of a wind generator, the pitch drive apparatus for moving a wind turbine rotor blade having a blade root mounted so as to be turnable around a blade longitudinal direction with respect to a rotor head, wherein the pitch drive apparatus includes a drive member having a linear actuator which turns and drives the wind turbine rotor blade around the blade longitudinal direction and changes a pitch angle thereof.

According to the above aspect, the wind turbine rotor blade is turned and driven around the axis thereof by the drive member constituted by the linear actuator, and the pitch angle of the wind turbine rotor blade is adjusted.

Since the linear actuator is electrically driven, the structure of an electric wire thereof becomes simple as compared with a hydraulic pipe, and there is no risk such as mixture of a foreign matter and leakage of oil. Further, as a contact portion causing fine motion is not included, it is unnecessary to take a fretting damage into consideration. Moreover, a part having short lifetime such as a belt is not included, a troublesome frequent maintenance operation is not required.

With this structure, it is possible to prevent long-term reliability of the pitch drive apparatus from being deteriorated.

In the above aspect, the linear actuator may include a columnar main body, and a rod appearing from the main body in an axial direction thereof.

Since the linear actuator includes the columnar main body and the rod appearing from the main body in the axial direction thereof, the linear actuator moves similarly to the hydraulic cylinder.

Therefore, the pitch drive apparatus can be constituted with the structure same as that of the hydraulic cylinder in which the main body is mounted on the side of the rotor head on a fixed side and a tip end of the rod is mounted on the side of the wind turbine rotor blade.

In the above structure, the wind turbine rotor blade may include two sets of linear actuators Since the apparatus is operated using two sets of linear actuators with respect to the wind turbine rotor blade, a predetermined pitch angle control range can be secured using a light-weighted linear actuator with the rod having a short stroke.

In the above aspect, the linear actuator may include a rail disposed on a predetermined path, and a guide moving along the rail.

The rail is mounted on one of the rotor head on the fixed side and the wind turbine rotor blade, and the guide is mounted on the remaining one.

When the guide is mounted on the fixed side, the guide does not move and thus the rail moves.

In the above structure, the rail preferably constitutes a portion of a circle formed around an axis center of the wind turbine rotor blade.

Since the rail constitutes a portion of the circle formed around the axis center of the wind turbine rotor blade, a moving position of the guide and a rotation angle correspond to each other. Therefore, it is possible to easily control the pitch angle of the wind turbine rotor blade.

In the above structure, the rail is preferably provided at a position separated from the axis center of the wind turbine rotor blade.

Since a radius of curvature is increased as separated from the axis center, the curvature of the rail becomes small. When the curvature becomes small, the curve of the rail becomes small. Therefore, reliability of the linear actuator can be enhanced.

Thus, it is preferable that the rail is provided at a location separated from the axis center of the wind turbine rotor blade as far as possible.

In the above aspect, an emergency power supply for operating the linear actuator by discharging may be provided in the rotor head.

When a main power supply has a power failure or the like, the wind generator is urgently stopped.

In this case, the linear actuator is not operated by the main power supply, but the linear actuator can be operated by discharging of the power supply. With this structure, the pitch angle of the wind turbine rotor blade can be adjusted and the wind turbine rotor blade can be located at a feather position. Thus, the wind generator can be stopped safely.

According to a second aspect of the present invention, there is provided a wind generator including: a plurality of wind turbine rotor blades for receiving a wind force; a rotor head for supporting the wind turbine rotor blades so as to be turnable around an axial direction of the wind turbine rotor blades and being rotated and driven by the wind turbine rotor blades; the pitch drive apparatus described above; and a generator set for generating electricity by rotation of the rotor head.

According to the above aspect, it is possible to prevent reliability of the pitch drive apparatus from being deteriorated with a simple structure by using the pitch drive apparatus according to the first aspect. It is therefore possible to prevent reliability of the wind generator from being deteriorated.

According to the present invention, the wind turbine rotor blade is turned and driven around the axis thereof using the drive member constituted by the electrically driven linear actuator, thereby adjusting the pitch angle of the wind turbine rotor blade. Therefore, the structure thereof can be simplified.

There is no risk such as mixture of a foreign matter and leakage of oil unlike the hydraulic system. Further, as a contact portion causing fine motion is not included unlike a gear type pitch drive mechanism, it is unnecessary to take a fretting damage into consideration. Moreover, a part having short lifetime such as a belt is not included, a troublesome frequent maintenance operation is not required.

With these features, it is possible to prevent long-term reliability of the pitch drive apparatus from being deteriorated.

EXPLANATION OF REFERENCE

Figure 1:
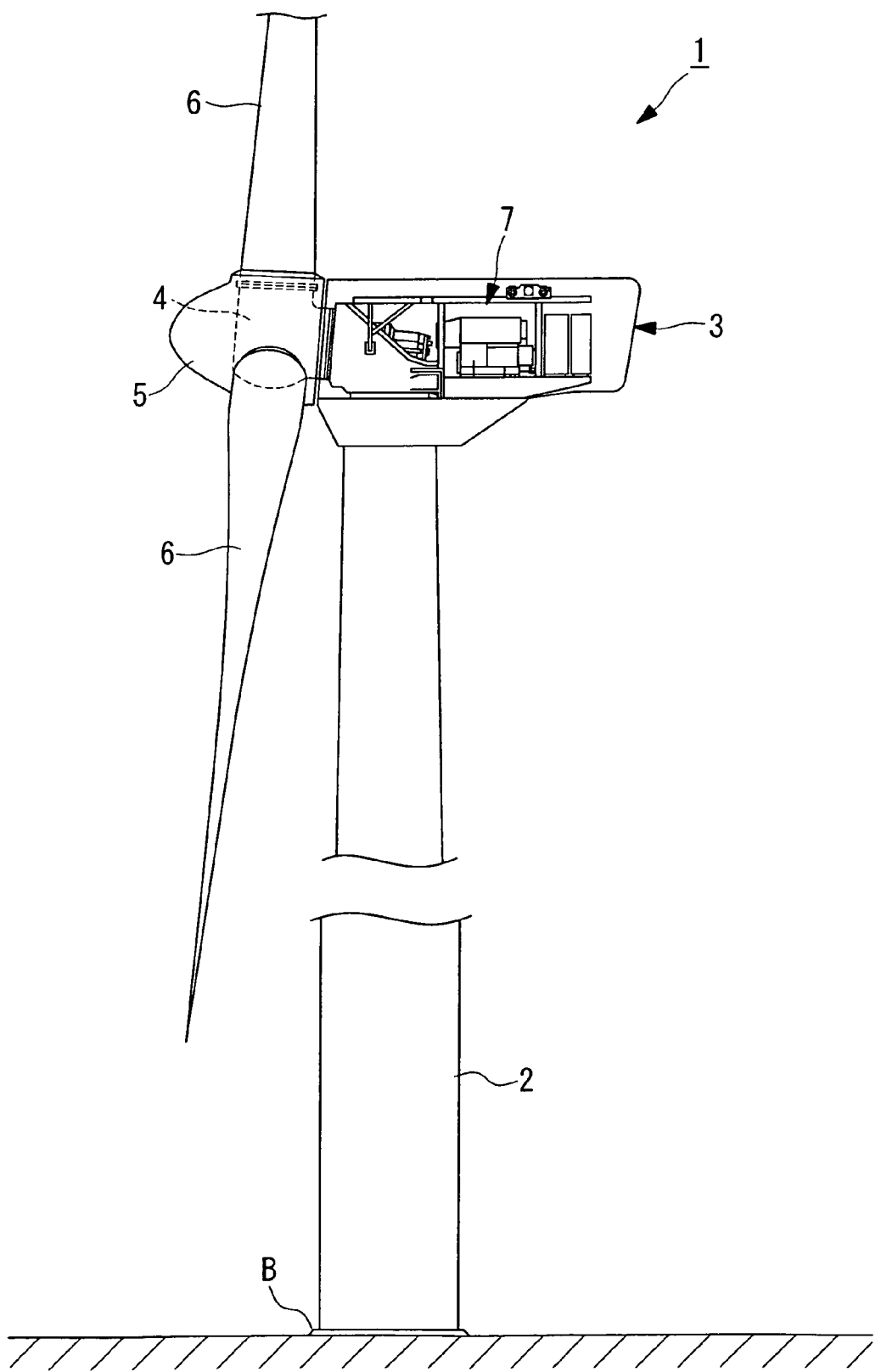
FIG. 1 A side view showing an overall schematic structure of a wind generator according to a first embodiment of the present invention.

1: Wind generator
4: Rotor head
6: Wind turbine rotor blade
7: Generator set
11, 31: Pitch drive apparatus
12, 12A, 12B: Linear actuator
13: Cylinder
14, 14A, 14B: Rod
32: Linear motor
33: Rail
34: Guide
O: Axis center

BEST MODE FOR CARRYING OUT THE INVENTION

Embodiments of the present invention will be explained with reference to the drawings.

First Embodiment

A wind generator according to a first embodiment of the present invention will be explained with reference to FIGS. 1 to 5.

FIG. 1 is a side view showing an overall schematic structure of a wind generator 1 according to a first embodiment of the present invention.

As shown in FIG. 1, the wind generator 1 produces electricity using wind power. The wind generator 1 includes a column 2 standing on a base B, a nacelle 3 provided on an upper end of the column 2, a rotor head 4 provided on the nacelle 3 such that the rotor head 4 can rotate around a substantially horizontal axis, a head capsule 5 covering the rotor head 4, a plurality of wind turbine rotor blades 6 radially mounted around a rotation axis of the rotor head 4, and a generator set 7 which generates electricity by rotating the rotor head 4.

As shown in FIG. 1, the column 2 extends upward from the base B (upward in FIG. 1), and a plurality of units are connected in the vertical direction or the like.

The uppermost portion of the column 2 is provided with the nacelle 3. When the column 2 includes the plurality of units, the nacelle 3 is disposed on the uppermost unit.

As shown in FIG. 1, the nacelle 3 rotatably supports the rotor head 4, and the generator set 7 which generates electricity by rotating the rotor head 4 is accommodated in the nacelle 3.

The plurality of wind turbine rotor blades 6 is radially mounted on the rotor head 4 around the rotation axis thereof, and the periphery of the rotor head 4 is covered with the head capsule 5.

In this structure, when a wind hits the wind turbine rotor blades 6 from a direction of the rotation axis of the rotor head 4, a force for rotating the rotor head 4 around its rotation axis is generated in the wind turbine rotor blades 6, and the rotor head 4 is rotated and driven.

Although three wind turbine rotor blades 6 are provided in this embodiment, the number of the wind turbine rotor blades 6 is not limited to three, but the number may be two, four or more with no particular limitation.

Figure 2:
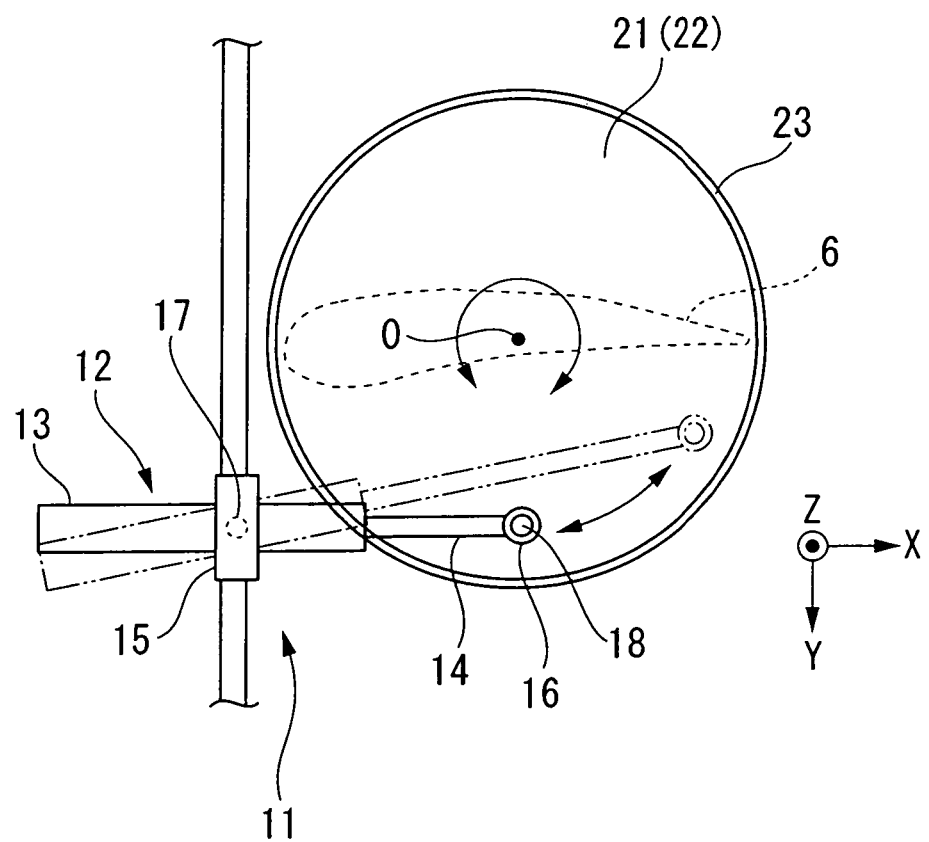
FIG. 2 A schematic diagram for explaining a positional relation between one of pitch drive apparatuses and one of wind turbine rotor blades shown in FIG. 1.

FIG. 2 is a schematic diagram for explaining a positional relation between one of pitch drive apparatuses 11 and one of the wind turbine rotor blades 6.

The rotor head 4 is provided with the pitch drive apparatuses 11 which rotate the wind turbine rotor blades 6 around its axis center O to change a pitch angle of the wind turbine rotor blade 6. The pitch drive apparatuses 11 are provided so as to correspond to the wind turbine rotor blades 6 in a one-to-one correspondence relationship.

The wind turbine rotor blades 6 are turnably supported by a rotating wheel bearing 23 in which the rotor head 4 is provided with a base portion 21 on the side of a blade root. A roller bearing is preferably used as a slide bearing used herein.

The base portion 21 is formed into a cylindrical shape. The base portion 21 includes a circular end surface 22 on the side of the rotor head 4. The base portion 21 is provided at the entire periphery thereof with a flange (not shown) projecting radially outward. The flange is turnably supported by the rotating wheel bearing 23 provided on the side of the rotor head 4. Therefore, the entire wind turbine rotor blade 6 can turn with respect to the rotor head 4.

The pitch drive apparatus 11 includes a linear actuator 12. The linear actuator 12 has a cylinder (main body) 13 and a rod 14 which appears from the cylinder 13 in the axial direction thereof. The linear actuator 12 indicates a driving apparatus which applies straight motion to a subject using the operating principles (an electromagnetic force) of the linear motor. The linear actuator 12 has such a structure that a cylindrical rotation motor is developed straightly.

The pitch drive apparatus 11 is provided with a cylinder bearing 15 disposed between the rotor head 4 and the cylinder 13, and a rod bearing 16 disposed between the rod 14 and the end surface 22 of the wind turbine rotor blade 6.

The cylinder 13 is a cylindrical hollow member, and a plurality of cylindrical electromagnetic coils (not shown) is arranged in the cylinder 13 in the longitudinal direction thereof. The rod 14 has a permanent magnet and is disposed in a space formed by the coils. The rod 14 appears from the cylinder 13 by adjusting a magnetic pole of the electromagnetic coils of the cylinder 13.

A mechanism of the appeared rod 14 is not limited to the above, and an appropriate mechanism can be used alternatively.

As described above, the linear actuator 12 includes the cylinder 13 and the rod 14 which appears from the cylinder 13 in the axial direction thereof. Therefore, the linear actuator 12 operates substantially in the same manner as a hydraulic cylinder.

Thus, the pitch drive apparatus 11 can be constituted with the structure same as that of the hydraulic cylinder in which the cylinder 13 is mounted on the side of the rotor head 4 on the fixed side and the tip end of the rod 14 is mounted on the side of the wind turbine rotor blade.

Figure 3:
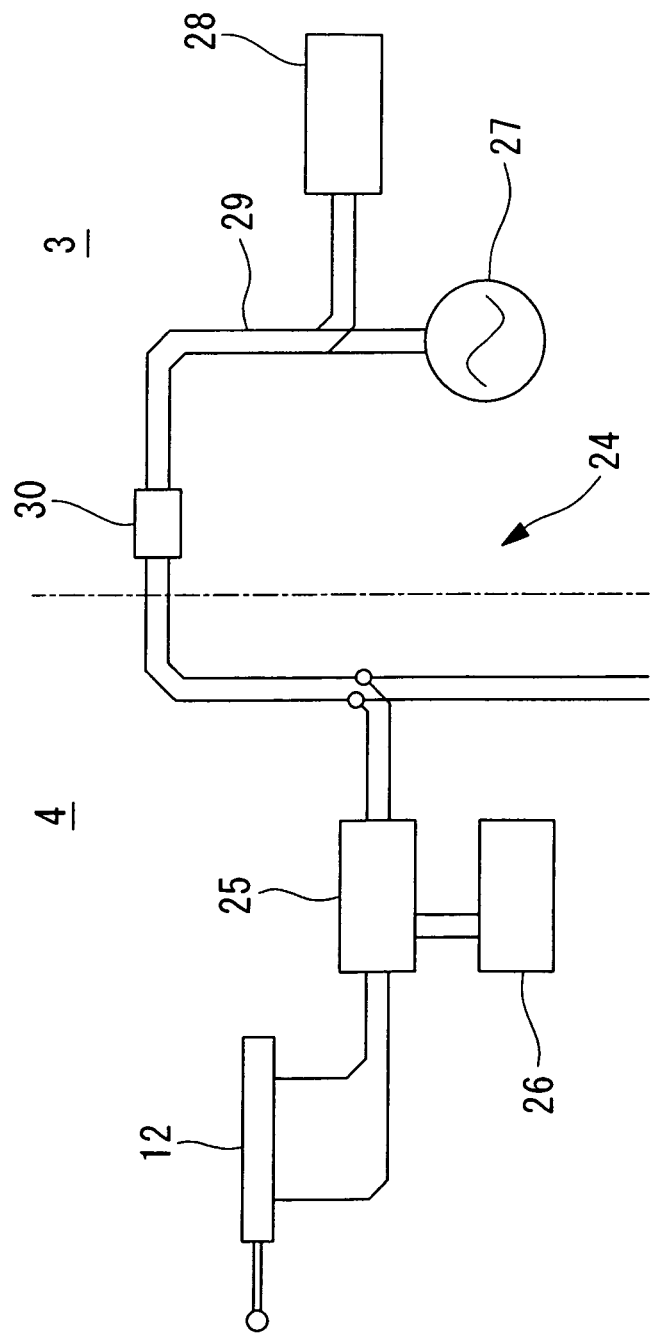
FIG. 3 A block diagram showing a schematic structure of an operation circuit of the pitch drive apparatus according to the first embodiment of the present invention.

FIG. 3 is a block diagram showing an outline of an operation circuit 24 of the pitch drive apparatus 11.

The operation circuit 24 includes a plurality of controllers 25 which are disposed in the rotor head 4 and control operations of the corresponding linear actuators 12, a plurality of batteries (power supplies) 26 which are disposed in the rotor head 4 and supply electricity to the controllers 25, a main power supply 27 disposed in the nacelle 3, a PLC (Programmable Logic Controller) 28 which is disposed in the nacelle 3 and control the entire operation, and a main electricity path 29 through which electricity is supplied to the controllers 25 from the main power supply 27.

The main electricity path 29 is connected by means of a rotary joint 30 such that the rotor head 4 can rotate with respect to the nacelle 3.

The main electricity path 29 branches off in the rotor head 4 to supply electricity to the controllers 25.

A capacitor may be used instead of the battery 26.

Since the linear actuator 12 is electrically driven, the electric wire thereof is simple in structure as compared with a hydraulic pipe. Further, since there is no operation of connecting the hydraulic pipe, there is no risk such as mixture of a foreign matter and leakage of oil. Further, as a contact portion causing fine motion is not included, it is unnecessary to take a fretting damage into consideration. Moreover, a part having short lifetime such as a belt is not included, a troublesome frequent maintenance operation is not required.

With this structure, it is possible to prevent long-term reliability of the pitch drive apparatus 11 from being deteriorated.

The cylinder 13 is provided with a pair of trunnions 17 as cylindrical members extending from a cylindrical surface of the cylinder 13 in the axial direction of the wind turbine rotor blade 6, i.e., in a Z-axial direction.

The cylinder 13 is disposed so as to extend substantially in parallel to a plane (i.e., a plane X-Y) which is substantially in parallel to the end surface 22 of the wind turbine rotor blade 6.

The cylinder bearing 15 supports the pair of trunnions 17 of the cylinder 13 such that the trunnions 17 can turn around an axis of the wind turbine rotor blade 6, i.e., around an axis extending along the Z-axis.

A rod bearing 16 is disposed on the tip end of the rod 14. A column 18 stands on the end surface 22 at a distance from the axis center O thereof. The rod bearing 16 is turnably mounted on the column 18, and absorbs turning motion around the Z-axis.

The rod bearing 16 may be a spherical bearing so as to absorb turning motions around the X-axis and Y-axis in the drawing.

As shown in FIG. 1, there may be exemplified the generator set 7 which includes a generator to which a rotation driving force of the rotor head 4 is transmitted and generates electricity, and a transformer which converts electricity generated by the generator into a predetermined voltage.

Next, an outline of a power generating method using the wind generator 1 constituted as described above will be explained.

In the wind generator 1, a force of wind which hits the wind turbine rotor blades 6 from the rotation axis direction of the rotor head 4 is converted into power for rotating the rotor head 4 around the rotation axis thereof.

Rotation of the rotor head 4 is transmitted to the generator set 7, electricity is generated by the generator, then the electricity is converted into a predetermined voltage by the transformer, and the voltage is converted into an AC voltage of a predetermined frequency by an inverter.

At least while electricity is generated, in order to effectively apply a wind force to the wind turbine rotor blade 6, the nacelle 3 is appropriately rotated on a horizontal plane and the rotor head 4 is directed upstream of the wind.

Next explained is control of a pitch angle of the wind turbine rotor blade 6 by the pitch drive apparatus 11.

As shown in FIG. 2, the pitch drive apparatus 11 turns the wind turbine rotor blade 6 around the axis center O by extending the rod 14 from the cylinder 13 or pulling the rod 14 into the cylinder 13, thereby changing the pitch angle thereof.

Electricity is supplied from the main power supply 27 to the controller 25 through the main electricity path 29. Using this electricity, the controller 25 adjusts the polarity of the electromagnetic coils in the cylinder 13, moves the rod 14 in the axial direction thereof, and extends the rod 14 from the cylinder 13 or pulls the rod 14 into the cylinder 13.

When the rod 14 is extended from the cylinder 13, since the end of the rod 14 is fixed at a position separated from the axis center O of the wind turbine rotor blade 6, a force rotating around the axial direction is applied to the wind turbine rotor blade 6.

When the wind turbine rotor blade 6 rotates around the axis center O, since a tip end position of the rod 14 moves in the end surface 22 as shown with two-dot chain line in FIG. 2, the cylinder 13 and the rod 14 turn around the axis of the trunnion 17 by the cylinder bearing 15.

At the same time, also in the rod bearing 16, the rod 14 and the wind turbine rotor blade 6 relatively turns around an axis substantially in parallel to the Z-axis.

When the rod 14 is pulled into the cylinder 13, the wind turbine rotor blade 6 turns around the axis, and the cylinder 13 and the rod 14 turn around the axis of the trunnion by the cylinder bearing 15 in the same manner as described above.

When the main power supply 27 has a power failure, the linear actuator 12 is not operated and the pitch angle of the wind turbine rotor blade 6 cannot be adjusted.

In this state, there is a possibility that the wind turbine rotor blade 6 or the like is damaged and electricity generating efficiency is deteriorated depending upon a power of wind. Therefore, the wind generator 1 is urgently stopped for inspection or repair.

In this case, the controller 25 causes the battery 26 to discharge so as to operate the linear actuator 12, adjusts the pitch angle of the wind turbine rotor blade 6, and brings the wind turbine rotor blade 6 to the feather position.

In this manner, even in a case where the main power supply 27 cannot be used due to a power failure or the like, the linear actuator 12 can be operated using the electricity of the battery 26 and the wind turbine rotor blade 6 can be brought into the feather position. Therefore, the wind generator 1 can be stopped safely.

Figure 4:
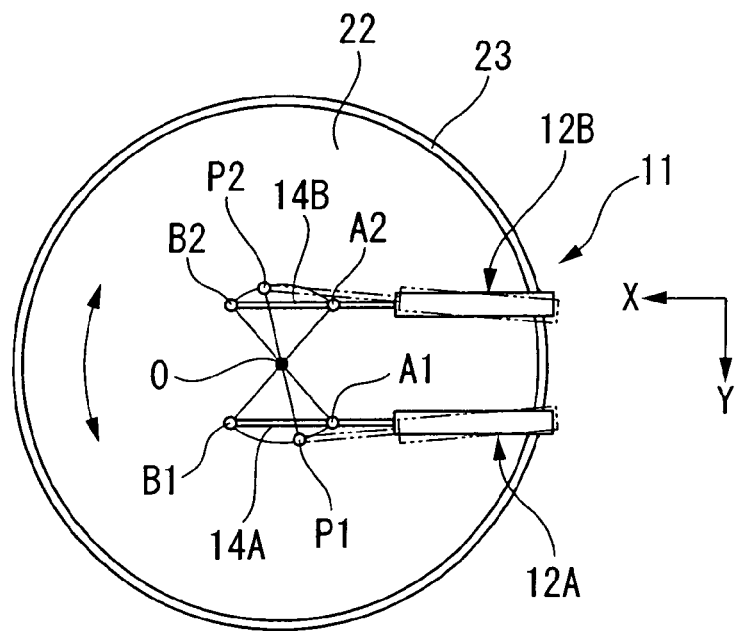
FIG. 4 A schematic diagram showing a modification of the pitch drive apparatus according to the first embodiment of the present invention.
Figure 5:
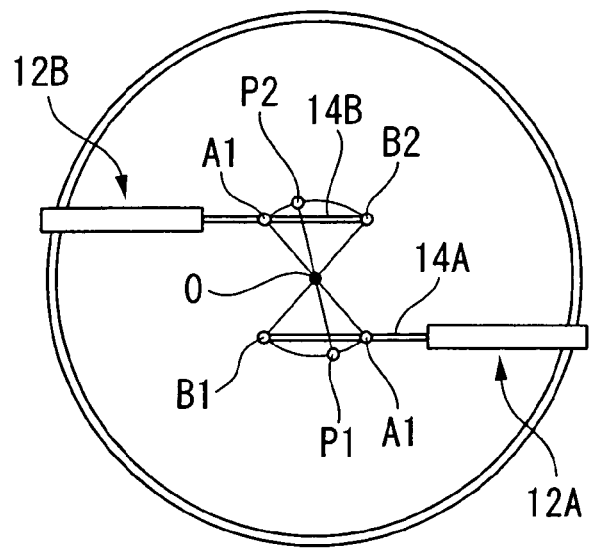
FIG. 5 A schematic diagram showing another modification of the pitch drive apparatus according to the first embodiment of the present invention.

Although the pitch drive apparatus 11 is constituted using one set of linear actuator 12 for each of the wind turbine rotor blades 6 in this embodiment, there may be employed modifications in which two sets of linear actuators 12 are used for each of the wind turbine rotor blades 6 as shown in FIGS. 4 and 5.

Specifically, according to the modification shown in FIG. 4, linear actuators 12A and 12B have basic positions (the state shown in FIG. 4) substantially in parallel to the X-axis, as shown in FIG. 4, or slightly inclined towards each other with the axis center O interposed therebetween, and the linear actuators 12A and 12B are disposed in the same manner as that of the above-described embodiment.

A rod 14A of the linear actuator 12A has a stroke extending and contracting from a most contracted position A1 to a most extended position B1. Similarly, a rod 14B of the linear actuator 12B has a stroke extending and contracting from a most contracted position A2 to a most extended position B2.

In the structure example shown in FIG. 4, when a piston rod 14A (14B) of the linear actuator 12A (12B) is contracted most at the position A1 (A2), a piston rod 14B (14A) of the other linear actuator 12B (12A) is located at the most extended position B2 (B1).

By rotating motors of the linear actuators 12A and 12B in the directions opposite from each other, the rod 14A (14B) extends (contracts) on the side of the linear actuator 12A (12B), and the tip end position of the rod 14 moves so as to draw an arc locus swelling outward from the point A1 (B2) to the point B1 (A2) as shown with a phantom line in the drawing.

As a result, the linear actuator 12A (12B) pushes the wind turbine rotor blade 6, and the other linear actuator 12B (12A) pulls the wind turbine rotor blade 6. With this structure, the wind turbine rotor blade 6 can be rotated in a clockwise (counterclockwise) direction.

In this manner, the pitch drive apparatus 11 turns the wind turbine rotor blade 6 using the two sets of linear actuators 12A and 12B for the wind turbine rotor blade 6. Therefore, even if the linear actuators 12A and 12B having short strokes of the rods 14A and 14B are employed, a pitch angle control range of substantially 90° can be obtained as in the conventional technique.

More specifically, in a case where conditions such as a diameter of the end surface 22 and a control angle α are the same as those shown in FIG. 1, a distance (a radius of the arc locus) from the axis center O as the turning center to the connection points P1 and P2 can be set smaller than that using one set of the linear actuator 12. Thus, strokes required for the linear actuators 12A and 12B can be made shorter.

When the linear actuators 12A and 12B having short strokes are used, the electric cylinder itself is made small and a weight thereof is reduced. Thus, the linear actuators 12A and 12B can be accommodated in the rotor head 4, a through hole for the electric cylinder which is required in the conventional technique becomes unnecessary, and the cylinder bearing and the like can be simplified. Therefore, the shape and the structure of the entire rotor head 4 can be simplified. With such simplification of the rotor head 4, the number of machining step can be reduced, which is advantageous in terms of costs.

One of the linear actuators 12A and 12B, e.g., the linear actuator 12A may laterally reversely be oriented such that the tip end of the rod 14A may be fixed to the rotor head 4. In this case, the tip end of the cylinder 13A is connected to the end surface 22.

In the modification shown in FIG. 5, the linear actuators 12A and 12B are disposed point-symmetrically with respect to the axis center O.

Even when the linear actuators 12A and 12B are disposed in this manner, the same operation and effect as those shown in FIG. 4 can be obtained.

According to the modification shown in FIG. 5, motions of the rods 14A and 14B of the linear actuators 12A and 12B, i.e., expansions and contractions are carried out in synchronization with each other. Thus, control of motion of the linear actuators 12A and 12B can further be simplified.

Second Embodiment

Next, a wind generator 1 according to a second embodiment of the present invention will be explained with reference to FIGS. 6 to 8.

The structure of a pitch drive apparatus 31 according to the present embodiment is different from that of the first embodiment. Thus, the different portion will be explained mainly, and explanation of the portion same as that of the first embodiment will not be repeated.

The same members as those of the first embodiment are designated with the same symbols.

In this embodiment, the pitch drive apparatus 31 includes a linear motor (a drive member, or a linear actuator) 32. The linear motor 32 includes a rail 33 having coils arranged along a longitudinal direction thereof, and a guide 34 having a magnet.

An operation circuit which supplies electricity to the coils of the rail 33 has the same structure as that of the first embodiment. That is, the operation circuit has an emergency battery or a capacitor.

Figure 6:
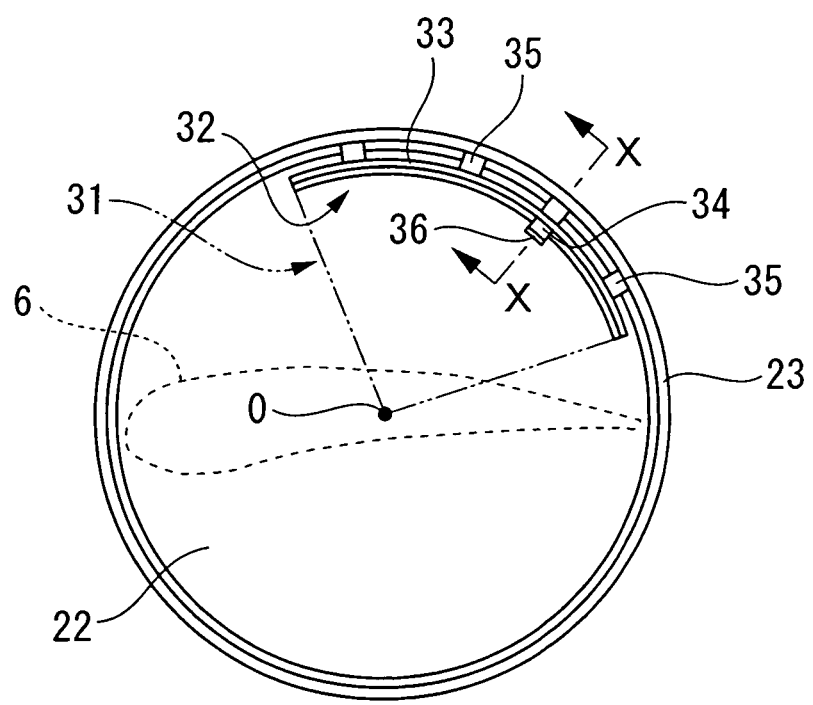
FIG. 6 A schematic diagram showing a pitch drive apparatus according to a second embodiment of the present invention.
Figure 7:
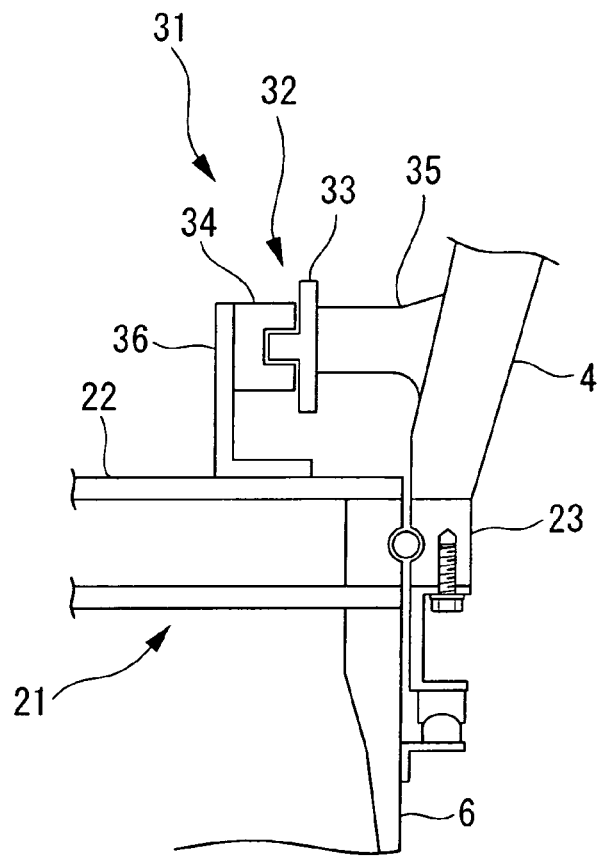
FIG. 7 A sectional view taken along the line X-X in FIG. 6.
Figure 8:
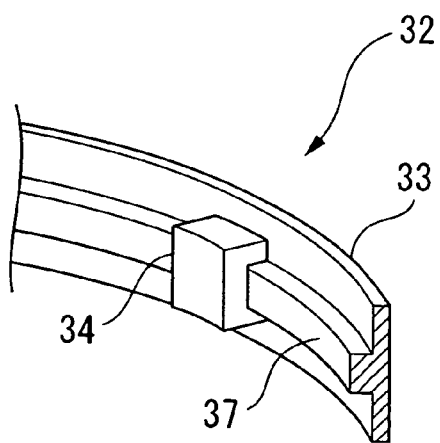
FIG. 8 A perspective view of a linear motor according to the second embodiment of the present invention.

As shown in FIGS. 6 and 7, the rail 33 is curved so as to constitute a partial circle formed around the axis center O of the wind turbine rotor blade 6. The rail 33 is held by brackets 35 which are fixed to the rotor head 4 at a distance from one another. That is, the rail 33 is fixed to the rotor head 4.

An angle formed between lines connecting the axis center O and two ends of the rail 33 is 95° for example. This is because, with the wind turbine rotor blade 6 which is designed to generate lift even when a wing chord agrees with a direction of the wind, the adjustment range of the pitch angle is increased so as not to generate lift.

A projecting portion 37 which guides the guide 34 is provided on an inner peripheral surface of the rail 33 over the entire length at an intermediate position in the width direction.

The guide 34 is movably engaged with the projecting portion 37 of the rail 33, and is fixed to the end surface 22 of the wind turbine rotor blade 6 using a bracket 36.

The linear motor 32 moves the guide 34 along the rail 33 by adjusting a magnetic pole of the coils arranged on the rail 33.

A mechanism for moving the guide 34 is not limited to the coils, and an appropriate mechanism may be alternatively used.

Since the linear motor 32 is electrically driven, its electric wire is simple as compared with the hydraulic pipe. Further, since there is no operation of connecting the hydraulic pipe, there is no risk such as mixture of a foreign matter and leakage of oil. Further, as a contact portion causing fine motion is not included, it is unnecessary to take a fretting damage into consideration. Further, a part having short lifetime such as a belt is not included, a troublesome frequent maintenance operation is not required.

With this structure, it is possible to prevent long-term reliability of the pitch drive apparatus 31 from being deteriorated.

Next, motion of the wind generator 1 constituted as described above will be explained.

Since the electricity generating method using the wind generator 1 is the same as that of the first embodiment, the same explanation is not repeated.

Next, control of the pitch angle of the wind turbine rotor blade 6 by the pitch drive apparatus 31 will be explained.

The pitch drive apparatus 31 moves the guide 34 along the rail 33 by adjusting the magnetic pole of the coils arranged on the rail 33. If the guide 34 is moved, the end surface 22 turns around the axis center O with respect to the rotor head 4 via the bracket 36. Thus, the pitch angle of the wind turbine rotor blade 6 can be changed.

At this time, since the rail 33 constitutes a portion of a circle formed around the axis center O of the wind turbine rotor blade 6, a moving position of the guide 34 and a rotation angle of the wind turbine rotor blade 6 correspond to each other. Therefore, it is possible to easily control the pitch angle of the wind turbine rotor blade 6.

The rail 33 is provided at a position closer to an outer peripheral surface of the end surface 22, i.e., a position separated from the axis center O of the wind turbine rotor blade 6.

With this structure, a radius of curvature of the rail 33 is increased and thus the curvature of the rail 33 is reduced. When the curvature is reduced, the curve of the rail 33 is reduced and reliability of the linear motor 32 can be enhanced.

In this manner, it is preferable that the rail 33 is provided at a position separated from the axis center O of the wind turbine rotor blade 6 as far as possible.

Figure 9:
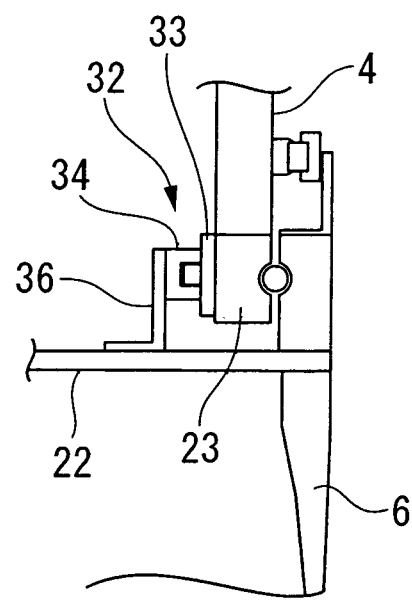
FIG. 9 A schematic diagram showing a modification of the pitch drive apparatus according to the second embodiment of the present invention.

Although the base portion 21 of the wind turbine rotor blade 6 is located inside the rotor head 4 in the present embodiment, the base portion 21 of the wind turbine rotor blade 6 may be located outside the rotor head 4 as shown in FIG. 9.

Figure 10:
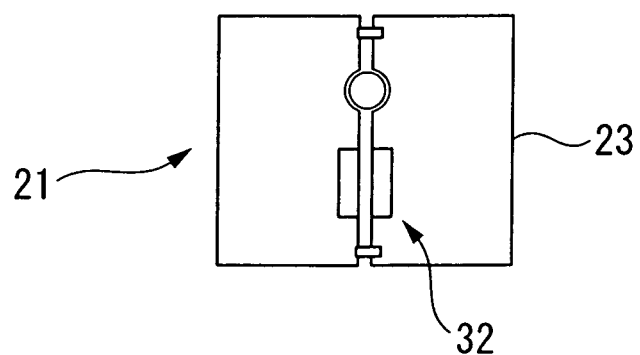
FIG. 10 A schematic diagram showing another modification of the pitch drive apparatus according to the second embodiment of the present invention.

The linear motor 32 may be incorporated between an inner wheel and an outer wheel of the rotating wheel 23 as shown in FIG. 10.

The rail 33 is mounted on the rotor head 4 on the fixed side and the guide 34 is mounted on the wind turbine rotor blade 6 on the movable side, which may be reversed. That is, the rail 33 may be mounted on the wind turbine rotor blade 6 on the movable side and the guide 34 may be mounted on the rotor head 4 on the fixed side.

Although one set of the linear motor 32 is provided in the present embodiment, a plurality of sets of linear motors 32 may be provided. As rotation driving forces are combined together with this structure, each of the linear motors 32 may have small output in the same condition. Thus, reliability thereof can be enhanced.

The present invention is not limited to the embodiments described above, but can appropriately be changed within a range not departing from a subject matter of the present invention.

The invention claimed is:

1. A pitch drive apparatus of a wind generator, the pitch drive apparatus for moving a wind turbine rotor blade having a blade root mounted so as to be turnable around a blade longitudinal direction with respect to a rotor head, wherein
the pitch drive apparatus includes a drive member having a linear actuator which turns and drives the wind turbine rotor blade around the blade longitudinal direction and changes a pitch angle thereof,
the linear actuator includes a rail disposed on a predetermined path and a guide moving along the rail, and
the guide and the rail are in contact with each other.

2. A pitch drive apparatus of the wind generator according to claim 1, wherein the rail constitutes a portion of a circle formed around an axis center of the wind turbine rotor blade.

3. A pitch drive apparatus of the wind generator according to claim 1, wherein the rail is provided at a position separated from an axis center of the wind turbine rotor blade.

4. A pitch drive apparatus of the wind generator according to claim 1, wherein an emergency power supply for operating the linear actuator by discharging is provided in the rotor head.

5. A pitch drive apparatus of a wind generator according to claim 1, wherein
the rail has coils arranged along a longitudinal direction thereof, and
the guide has a magnet.

6. A pitch drive apparatus of a wind generator according to claim 5, wherein the rail has a projection portion, and the guide is disposed on an inner peripheral surface of the rail and guided on the projection portion.

7. A pitch drive apparatus of the wind generator according to claim 1, wherein the rail has a projection portion, and the guide is disposed on an inner peripheral surface of the rail and guided on the projection portion while an inner surface of the guide is fitted on a surface of the projection portion.

8. A wind generator comprising:

a plurality of wind turbine rotor blades for receiving a wind force;

a rotor head for supporting the wind turbine rotor blades so as to be turnable around an axial direction of the wind turbine rotor blades and being rotated and driven by the wind turbine rotor blades;

a pitch drive apparatus including a drive member having a linear actuator which turns and drives the wind turbine rotor blades around a blade longitudinal direction and changes a pitch angle thereof, the linear actuator including a rail disposed on a predetermined path, and a guide moving along the rail; and a generator set for generating electricity by rotation of the rotor head, wherein the guide and the rail are in contact with each other.

9. A wind generator according to claim 8, wherein the rotor head comprises a controller controlling an operation of the linear actuator, and a plurality of batteries supplying electricity to the controller.

10. A wind generator according to claim 9, further comprising a nacelle comprising a programmable logic controller controlling an operation of the wind generator, and a main electricity path through which the electricity is supplied to the controller.

11. A wind generator according to claim 10, further comprising a rotary joint connecting the main electricity path such that the rotor head rotates with respect to the nacelle.

12. A wind generator according to claim 8, wherein the rail has coils arranged along a longitudinal direction thereof, and the guide has a magnet.

13. A wind generator according to claim 12, wherein the rail has a projection portion, and the guide is disposed on an inner peripheral surface of the rail and guided on the projection portion.

* * * * *